United States Patent
Li

(10) Patent No.: US 10,389,571 B2
(45) Date of Patent: Aug. 20, 2019

(54) SYSTEM IMPLEMENTED ON THE BASIS OF A FIELD BROADBAND BUS ARCHITECTURE OF INDUSTRIAL INTERNET

(71) Applicant: KYLAND TECHNOLOGY CO., LTD., Beijing (CN)

(72) Inventor: Ping Li, Beijing (CN)

(73) Assignee: KYLAND TECHNOLOGY CO., LTD, Beijing (CN)

( * ) Notice: Subject to any disclaimer, the term of this patent is extended or adjusted under 35 U.S.C. 154(b) by 35 days.

(21) Appl. No.: 15/858,928

(22) Filed: Dec. 29, 2017

(65) Prior Publication Data
US 2019/0013989 A1 Jan. 10, 2019

(30) Foreign Application Priority Data
Jul. 5, 2017 (CN) .......................... 2017 1 0543947

(51) Int. Cl.
*H04W 4/00* (2018.01)
*H04L 27/26* (2006.01)
(Continued)

(52) U.S. Cl.
CPC ...... *H04L 27/2695* (2013.01); *G06F 11/2002* (2013.01); *G06F 13/3625* (2013.01);
(Continued)

(58) Field of Classification Search
CPC ............. H04L 27/2695; H04L 27/2613; H04L 27/2602; H04L 27/2646; H04L 12/413;
(Continued)

(56) References Cited

U.S. PATENT DOCUMENTS 10,212,016 B2* 2/2019 Shao .................... H04L 27/2662
2006/0251124 A1* 11/2006 Colmant ............... H04L 49/153
370/503
(Continued)

FOREIGN PATENT DOCUMENTS

CN 105959195 A 9/2016
WO 2009129852 A1 10/2009

OTHER PUBLICATIONS

Choong Il Yeh et al., "An Efficient TDMA Based MAC Frame Structure in OFDM Systems", The 14th IEEE 2003 International Symposium on Personal, Indoor and Mobile Radio Communication Proceedings, Sep. 7, 2003, pp. 559-563, IEEE.

*Primary Examiner* — Chuong T Ho
(74) *Attorney, Agent, or Firm* — Arent Fox LLP; Michael Fainberg

(57) ABSTRACT

The disclosure relates to a system implemented on the basis of a field broadband bus architecture of industrial internet, where this system is based upon a two-wire data transmission network widely applied in a traditional industry control system; multi-carrier orthogonal frequency division multiplexing technology is introduced to provide a large bandwidth above hundreds of megahertz; a design of a special frame structure, reasonable static and dynamic configurations of physical layer resource blocks, as well as a scheduling strategy of data services at medium access control layer, achieve proper mapping of transmission services to time slices; and a fast synchronized, real-time, high-speed, and reliable solution is provided with respect to the good performance, high reliability, strict real-time characteristic and high security required by a field broadband bus architecture of industrial internet.

9 Claims, 3 Drawing Sheets

(51) Int. Cl.
| | |
|---|---|
| *G06F 11/20* | (2006.01) |
| *H04L 5/00* | (2006.01) |
| *H04L 5/02* | (2006.01) |
| *H04L 5/22* | (2006.01) |
| *H04L 12/40* | (2006.01) |
| *H04L 12/413* | (2006.01) |
| *H04L 12/911* | (2013.01) |
| *H04L 12/927* | (2013.01) |
| *G06F 13/362* | (2006.01) |
| *G06F 13/40* | (2006.01) |
| *H04W 56/00* | (2009.01) |

(52) U.S. Cl.
CPC ........ *G06F 13/4068* (2013.01); *H04L 5/0087* (2013.01); *H04L 5/023* (2013.01); *H04L 5/22* (2013.01); *H04L 12/40* (2013.01); *H04L 12/413* (2013.01); *H04L 27/2602* (2013.01); *H04L 27/2613* (2013.01); *H04L 27/2646* (2013.01); *H04L 27/2666* (2013.01); *H04L 27/2675* (2013.01); *H04L 47/781* (2013.01); *H04L 47/801* (2013.01); *H04L 47/805* (2013.01); *H04W 56/0015* (2013.01); *H04L 27/2665* (2013.01)

(58) Field of Classification Search
CPC ....... H04L 12/40; H04L 5/22; H04L 27/2675; H04L 27/2666; H04L 5/023; H04L 47/801; H04L 5/0087; H04L 47/805; H04L 47/781; H04L 27/2665; H04W 56/0015; G06F 13/3625; G06F 13/4068; G06F 11/2002
USPC .................................................. 370/329, 330
See application file for complete search history.

(56) References Cited

U.S. PATENT DOCUMENTS

| | | | | |
|---|---|---|---|---|
| 2012/0176990 | A1* | 7/2012 | Zou | H04L 5/0007 370/329 |
| 2013/0250967 | A1* | 9/2013 | Premke | H04L 69/14 370/431 |
| 2014/0025854 | A1* | 1/2014 | Breuninger | G05B 19/0423 710/110 |
| 2014/0126582 | A1* | 5/2014 | Premke | H04L 12/403 370/431 |
| 2016/0080208 | A1* | 3/2016 | Takemoto | H04L 12/44 398/66 |
| 2019/0013986 | A1* | 1/2019 | Shao | H04L 27/2662 |

* cited by examiner

SYSTEM IMPLEMENTED ON THE BASIS OF A FIELD BROADBAND BUS ARCHITECTURE OF INDUSTRIAL INTERNET

CROSS-REFERENCE TO RELATED APPLICATIONS

This application claims the priority to Chinese Patent Application No. CN201710543947.0, filed on Jul. 5, 2017, the content of which is hereby incorporated by reference in its entirety.

FIELD

The present disclosure relates to the field of industrial internet technology, and specifically to a system implemented on the basis of a field broadband bus architecture of industrial internet.

BACKGROUND

With the development of the Internet technologies, various buses are widely used in industrial field automation to achieve real-time monitoring of an industrial field by a control end.

In presently existing technology buses used in industrial fields are generally single-carrier buses, and typically include Controller Area Network (CAN) buses or Ethernet buses. The transmission bandwidth of a CAN bus is typically below 50 MHZ. When used in a large industrial field, a CAN bus needs to connect with a large number of industrial field devices, where all these industrial field devices need to communicate data with a control end by occupying some transmission bandwidth. However, since the transmission bandwidth of the CAN bus is quite low, transmission rate of data in the bus is low, resulting in poor performance of transmission. When an Ethernet bus is used in an industrial field, industrial field devices need to access the Ethernet and transmit data through an Ethernet switch, thus complicating the structure of the network system and making wiring in the field difficult. Moreover, Ethernet channels are allocated using the protocol of Carrier Sense Multiple Access with Collision Detection (CSMA/CD), which is suitable for burst data transmission other than real-time transmission, so the Ethernet bus is unsuitable for a large industrial field or for an industrial field where real-time transmission is highly required.

In view of this challenge, it is difficult for single-carrier buses mentioned above to satisfy transmission performance requirements of various industrial field devices in a large industrial field.

SUMMARY

Embodiments of the disclosure provide a system implemented on the basis of a field broadband bus architecture of industrial internet so as to address the existing problem that it is difficult for single-carrier buses mentioned above to satisfy transmission performance requirements of various industrial field devices in a large industrial field.

An embodiment of the disclosure provides a system implemented on the basis of a field broadband bus architecture of industrial internet, the system including: a bus controller, at least one bus terminal, and a two-wire bus, where the bus controller and the bus terminal are connected via the two-wire bus to constitute a network, the bus controller communicates with any of the at least one bus terminal using Orthogonal Frequency Division Multiplexing, OFDM, technology, if the system includes at least two bus terminals, the bus terminals communicate with each other using OFDM technology, subcarriers occupied by each of the bus terminals do not interfere with each other, and a frame structure of a signal frame used during communication comprises a downlink system subframe, a downlink subframe, and an uplink subframe; the bus controller is configured to: transmit a downlink pilot signal in the downlink system subframe; transmit a broadcast message in the downlink subframe to instruct the bus terminal to be initialized; after reception of an access request transmitted by the bus terminal in the uplink subframe, allocate channel resource blocks for the bus terminal based upon service information in the access request; and transmit a result of allocating the channel resource blocks to the bus terminal in the downlink subframe; and the bus terminal is configured to: perform system synchronization and channel estimation, based upon the received downlink pilot signal; transmit the access request in the uplink subframe after reception of the broadcast message; transmit and receive service data based upon the received result of allocating the channel resource blocks.

Optionally, the downlink system subframe is a first subframe in each signal frame; the bus controller is configured to transmit the downlink pilot signal to the bus terminal in the downlink system subframe before transmitting a downlink signal to the bus terminal in the downlink subframe; and the bus terminal is configured to: determine a clock offset and a symbol offset between the bus terminal and the bus controller based upon the received downlink pilot signal; correct a clock respectively for a received signal and a signal to be transmitted, based upon the clock offset; adjust a window position respectively for the received signal and the signal to transmitted, based upon the symbol offset; and adjust a transmission delay of sending time for a signal to be transmitted to the bus controller after a transmission delay between the bus terminal and the bus controller is determined, so as to be synchronized with the system.

Optionally, the service information includes a service type and a service amount corresponding to the service type; and the channel resource blocks allocated by the bus controller for the bus terminal include an uplink subframe channel resource block and a downlink subframe channel resource block; the bus controller is configured to: allocate channel resource blocks corresponding to the service type for the bus terminal according to the service type; and determine the number of the allocated channel resource blocks corresponding to the service type based upon the service amount corresponding to the service type; and the bus terminal is configured to: transmit the service data to the bus controller over the uplink subframe channel resource block corresponding to the service type, according to the result of allocating the channel resource blocks; and receive a response message fed back by the bus controller for the received service data, over the downlink subframe channel resource block corresponding to the service type.

Optionally, each OFDM symbol in the uplink subframe carries an uplink pilot signal in addition to a data signal to instruct the bus controller to perform channel estimation; and a ratio of subcarriers of the uplink subframe occupied by the data signal to subcarriers of the uplink subframe occupied by the uplink pilot signal is allocated according to a preset ratio.

Optionally, there are a first guard interval between a downlink subframe and a uplink subframe of the signal frame, and a second guard interval between a uplink subframe of the signal frame and a downlink system subframe of a next signal frame, where the first guard interval reserves time for switching between the downlink subframe and the uplink subframe of the signal frame, and the second guard interval reserves time for switching between the uplink subframe of the signal frame and the downlink system subframe of the next signal frame.

Optionally, the signal frame further includes an uplink random access system subframe; the bus terminal is further configured to transmit the uplink pilot signal and the data signal to the bus controller in the uplink random access system subframe, where the data signal comprises the access request; and the bus controller is further configured to: perform channel estimation according to the uplink pilot signal, and allocate channel resource blocks for the bus terminal in response to the access request.

Optionally, the bus controller transmits data in a first time slice consisting of the downlink subframe and the downlink system subframe; and the bus terminal transmits data in a second time slice consisting of the uplink subframe; when the bus terminal communicates with the bus controller, then the bus terminal receives data in the downlink subframe and the downlink system subframe; and when the bus terminals communicate with each other, the bus terminals receive data in the uplink subframe.

Optionally, a signal frame including the uplink random access system subframe is a special frame, and a signal frame including no uplink random access system subframe is a normal frame; subframes in the normal frame are arranged in the order of the downlink system subframe, the downlink subframe, the first guard interval, the uplink subframe, and the second guard interval; and subframes in the special frame are arranged in the order of downlink system subframe, the downlink subframe, the first guard interval, the uplink subframe, the uplink random access system subframe, and the second guard interval; and the number of OFDM symbols in each of the downlink system subframe, the downlink subframe, the first guard interval, the second guard interval, the uplink subframe, and the uplink random access system subframe in the signal frame is preset as needed.

Optionally, when the bus controller communicates with any of the bus terminals using OFDM technology, and when the bus terminals communicate with each other using OFDM technology, data transmitted in the signal frame includes a destination IP address and a source IP address.

Optionally, the system further includes a spare bus controller configured to be enabled when it is determined that the bus controller in the system operates abnormally.

In the system implemented on the basis of the field broadband bus architecture of industrial internet according to the embodiments of the disclosure, the bus controller can transmit data with each bus terminal using OFDM technology, and bus terminals can transmit data with each other using OFDM technology. The subcarriers occupied by each bus terminal does not interfere with each other, thus effectively preventing communication interference among the bus terminals, improving the utilization ratio of bandwidth during data transmission, and achieving a large bandwidth up to hundreds MHz. Furthermore the bus controller in the system can transmit a downlink pilot signal in a downlink system subframe so that each bus terminal is synchronized rapidly with the system based upon the downlink pilot signal, and in the embodiments of the disclosure, each signal frame includes a downlink system subframe carrying a downlink pilot signal, so that each bus terminal can perform channel estimation according to the downlink pilot signal, thus improving the error correction capability of the system so as to improve the reliability of the system. Furthermore the bus controller can transmit a broadcast message in a downlink subframe to instruct each bus terminal to be initialized, so that each bus terminal is initialized. Furthermore each bus terminal can transmit an access request carrying service information in an uplink subframe, so that the bus controller can allocate channel resource blocks for each bus terminal according to the service information in the access request, and since the channel resource blocks are allocated in response to a service demand, the resources can be allocated more reasonably to provide real-time data transmission as demanded. Hereupon the embodiments of the disclosure provide a fast synchronized, real-time, high-speed, and reliable solution with respect to the good performance, high reliability, strict real-time characteristic and high security required by a field broadband bus architecture of industrial internet.

DETAILED DESCRIPTION OF THE EMBODIMENTS

The technical solutions according to the embodiments of the disclosure are described below clearly and fully with reference to the drawings in the embodiments of the disclosure, and apparently the embodiments described below are only a part other than all of the embodiments of the disclosure. Based upon the embodiments disclosed herein, all the other embodiments which can occur to those skilled in the art without any inventive effort shall fall into the scope of the disclosure.

The embodiments of the disclosure provide fast synchronized, real-time, high-speed, and reliable solution with respect to the good performance, high reliability, strict real-time characteristic and high security required by a field broadband bus architecture of industrial internet.

The embodiments of the disclosure are described below in further details with reference to the drawings.

Figure 1:
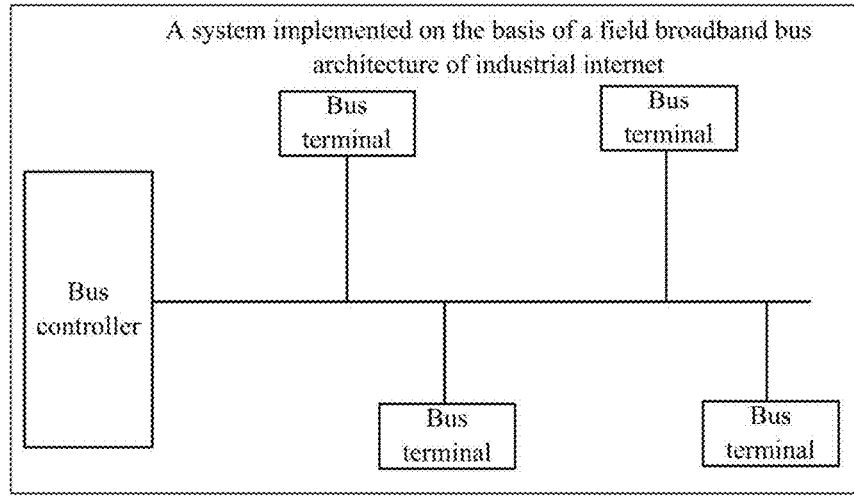
FIG. 1 is a schematic structural diagram of a system implemented on the basis of a field broadband bus architecture of industrial internet according to an embodiment of the disclosure.

FIG. 1 illustrates a schematic structural diagram of a system implemented on the basis of a field broadband bus architecture of industrial internet according to an embodiment of the disclosure.

The system includes a bus controller, at least one bus terminal, and a two-wire bus. The bus controller and the bus terminal are connected via the two-wire bus to constitute a network. The bus controller communicates with any of the at least one bus terminal using OFDM technology. If the system includes more than one bus terminals, then the bus terminals communicate with each other using OFDM technology as well, and subcarriers occupied by each bus terminal do not interfere with each other. The two-wire bus is a field broadband bus such as a pair of differential bus with two lines which transmits a signal using OFDM technology.

Figure 2:
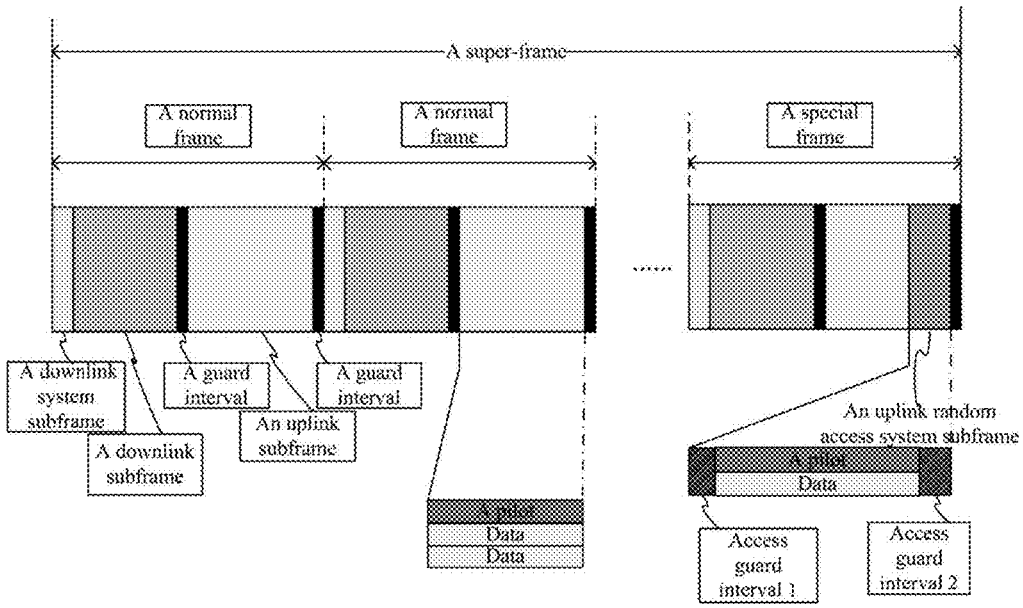
FIG. 2 is a schematic structural diagram of a signal frame used during communication by using OFDM technology according to an embodiment of the disclosure.

Specifically FIG. 2 illustrates a frame structure of a signal frame used during communication using OFDM technology according to an embodiment of the disclosure. Operating processes of the bus controller and the bus terminal in the system according to the embodiment of the disclosure are described below in details together with functions of each subframe in the frame structure.

(1) The frame structure of the signal frame includes a downlink system subframe, a downlink subframe, and an uplink subframe.

After the system has been powered on, between the bus controller and the bus terminal, first, system synchronization and channel estimation may be completed via the downlink system subframe in the signal frame, and then network initialization and channel resource scheduling may be completed via the downlink subframe and the uplink subframe in the signal frame, specifically as follows.

The bus controller is configured to: transmit a downlink pilot signal in the downlink system subframe; transmit a broadcast message in the downlink subframe to instruct the bus terminal to be initialized; upon reception of an access request transmitted by the bus terminal in the uplink subframe, allocate channel resource blocks to the bus terminal based upon service information in the access request; and transmit a result of allocating the channel resource blocks to the bus terminal in the downlink subframe.

The bus terminal is configured to: perform system synchronization and channel estimation based upon the received downlink pilot signal; transmit the access request in the uplink subframe upon reception of the broadcast message; transmit and receive service data based upon the received result of allocating the channel resource blocks.

Here in order to improve the reliability of the system during data transmission, in the embodiment of the disclosure, a downlink system subframe is added to be a first subframe (that is, before each downlink subframe) in each signal frame to perform channel estimation and to keep system synchronization. The system synchronization includes clock synchronization and symbol synchronization.

In a specific implementation, the bus controller may transmit the downlink pilot signal to the bus terminal in the downlink system subframe before transmitting a downlink signal to the bus terminal in the downlink subframe. Correspondingly the bus terminal may determine a clock offset and a symbol offset between the bus terminal and the bus controller based upon the received downlink pilot signal; correct a clock respectively for a received signal and a signal to be transmitted based upon the clock offset, and adjust a window position of the received signal and the signal to transmitted, respectively, based upon the symbol offset; and adjust a transmission delay of sending time for a signal to be transmitted to the bus controller after a transmission delay between the bus terminal and the bus controller is determined, so as to be synchronized with the system.

In the embodiment of the disclosure, the bus terminal takes the bus controller as a standard. During reception and transmission of a signal, the bus terminal corrects a clock adaptively and determines a window position for a received signal and a signal to be transmitted, respectively, according to the downlink pilot signal so as to synchronize clock and symbol with the bus controller. The bus terminal adjusts sending time of a signal according to transmission delay so as to synchronize all the devices in the bus system, thus providing an underlying guarantee for a rigorously real-time service. The bus controller does not make any adjustment during signal transmission or signal reception.

Furthermore when the system is being initialized, the bus controller may transmit the broadcast message to the bus terminal in the downlink subframe to instruct the bus terminal to be initialized, where the broadcast message may include a parameter required by each bus terminal during system initialization. Correspondingly the bus terminal can be initialized according to the parameter in the broadcast message after reception of the broadcast message, and transmit the access request to the bus controller in the uplink subframe after being initialized.

Here the access request carries the service information, where the service information includes a service type, and a service amount corresponding to the service type. The bus controller can transmit an access acknowledgement message, carrying the result of allocating the channel resource blocks, in the downlink subframe.

In a specific implementation, the bus controller can allocate to the bus terminal the channel resource blocks corresponding to the service type in the access request, and determine the number of the channel resource blocks to be allocated corresponding to the service type in the access request according to the service amount corresponding to the service type. The channel resource blocks allocated by the bus controller for the bus terminal include an uplink subframe channel resource block and a downlink subframe channel resource block.

Furthermore, the bus terminal can transmit the service data to the bus controller over the uplink subframe channel resource block corresponding to the service type, according to the result of allocating the channel resource blocks transmitted by the bus controller, and can obtain a response message fed back by the bus controller for the received service data, over the downlink subframe channel resource block corresponding to the service type.

Here the service type in the service information includes a fixed velocity service and a varying velocity service. The fixed velocity service refers to a data service for which real-time transmission is not highly required, or for which there is a stable transmission demand. And the varying velocity service refers to a data service for which real-time transmission is highly required, or for which there is a varying transmission demand, or for which there is an undecided data service. The transmission demand mentioned above at least includes bandwidth and speed.

In a specific implementation, if the bus controller determines that the service type in the received service information is a fixed velocity service, then it allocates to the bus terminal fixed velocity service resource blocks for transmitting the fixed velocity service, and determines the number of the fixed velocity service resource blocks to be allocated according to the service amount of the fixed velocity service. Correspondingly the bus terminal can transmit the service data to the bus controller over the fixed velocity service resource blocks according to the result of allocating the channel resource blocks, and obtain the response message fed back by the bus controller for the received service data, over the fixed velocity service resource blocks.

If the bus controller determines that the service type in the service information is a varying velocity service, then it allocates to the bus terminal varying velocity service resource blocks for transmitting the varying velocity service, and determines the number of the varying velocity service resource blocks to be allocated according to the service amount of the varying velocity service. Correspondingly the bus terminal can transmit the service data to the bus controller over the varying velocity service resource blocks according to the result of allocating the channel resource blocks, and obtain the response message fed back by the bus controller for the received service data, over the varying velocity service resource blocks.

Here when the system is being initialized, that is, when the bus terminal requests for an access to the bus controller, the service type carried in the reported access request is a fixed velocity service, so that the bus controller can allocate to the bus terminal fixed fixed velocity service resource blocks, and the bus terminal does not have to report any fixed velocity service again in a period of time. Furthermore, after the access has succeeded, that is, the bus terminal and the bus controller in the system operate stably, if the bus terminal needs to change the service type or adds a varying velocity service, it may request the bus controller in the uplink subframe for allocating resources according to the changed service type or the added varying velocity service. Correspondingly the bus controller can allocate varying velocity service resource blocks for the changed service type or the added varying velocity service reported by the bus terminal.

Furthermore, in a specific implementation, a priority of each data service can be determined respectively according to a service type of each data service and a preset mapping relationship between a priority and a service type. The data service includes a varying velocity service and a fixed velocity service.

Resource blocks are allocated respectively for each data service among corresponding pre-allocated resource blocks according to the priority of each data service, and a result of allocating the resource blocks is transmitted to the bus terminal, so that the bus terminal transmits each data service correspondingly according to the result of allocating the resource blocks.

In this way, the bus terminal can transmit and receive the service data over the channel resource blocks allocated by the bus controller for the bus terminal. Furthermore in the embodiment of the disclosure, the bus controller can allocate the channel resource blocks for transmitting the fixed velocity service or for the varying velocity service according to the service type reported by the bus terminal to thereby accommodate different service demands of different bus terminals so as to guarantee real-time data transmission.

Furthermore in order to further improve stability of the system during data transmission, each OFDM symbol in the uplink subframe of the signal frame according to the embodiment of the disclosure carries an uplink pilot signal in addition to a data signal, where the ratio of allocated subcarriers of the uplink subframe occupied by the data signal to allocated subcarriers of the uplink subframe occupied by the uplink pilot signal can be preset as needed in reality, and optionally can be preset as 2:1. The uplink pilot signal is configured to instruct the bus controller to perform channel estimation. Stated otherwise, the bus controller can extract the uplink pilot signal to perform the channel estimation, after reception of the data transmitted by the bus terminal in the uplink subframe. Specifically the bus controller can calculate an approximate impulse response of the channel which approximates a real channel impulse response as closely as possible using the uplink subframe to compensate for the channel.

Moreover if the at least one bus terminal includes at least two bus terminals, the bus terminals communicating with the bus controller using OFDM technology can also communicate with each other directly over the bus using OFDM technology. For example, a bus terminal A can transmit data to a bus terminal B over uplink subframe channel resource blocks occupied by the bus terminal A, and furthermore the bus terminal B can also transmit data to the bus terminal A over uplink subframe channel resource blocks occupied by the bus terminal B after reception of the data transmitted by the bus terminal A.

Furthermore in the embodiment of the disclosure, the bus controller transmits data in a first time slice consisting of the downlink subframe and the downlink system subframe, and the bus terminals share a second time slice consisting of the uplink subframe to transmit data. When the bus terminals communicate with the bus controller, the bus terminals receive data in the downlink subframe and the downlink system subframe. When the bus terminals communicate with each other, they receive data in the uplink subframe. Furthermore when any one bus terminal transmits data to the bus controller in the uplink subframe, the bus controller may receive the data transmitted by the bus terminal in the uplink subframe.

Of course, in a specific implementation, the bus terminals can alternatively communicate with each other through relaying by the bus controller, that is, data of one of the bus terminals can be transmitted to the bus controller, and the bus controller can further forward the data to the corresponding bus terminal, although a repeated description thereof is omitted here.

(2) There are also guard intervals in the frame structure of the signal frame.

Here there are a first guard interval between the downlink subframe and the uplink subframe of the signal frame, and a second guard interval between the uplink subframe of the signal frame and a downlink system subframe of a next signal frame. The first guard interval reserves time for switching between the downlink subframe and the uplink subframe of the signal frame, and the second guard interval reserves time for switching between the uplink subframe of the signal frame and the downlink system subframe of the next signal frame, thus preventing collision while data is being transmitted or received in the uplink or downlink subframe.

Moreover in an embodiment of the disclosure, the frame structure of the signal frame can further include an uplink random access system subframe. After the system has been initialized, and the bus controller and the bus terminal operate normally with each other, if a new bus terminal needs to join the bus controller, the new bus terminal may transmit an access request to the bus controller in the uplink random access system subframe.

Specifically the newly joined bus terminal may transmit an uplink pilot signal and the access request to the bus controller in the uplink random access system subframe. The bus controller can perform channel estimation according to the uplink pilot signal, and allocate channel resource blocks for the newly joined bus terminal according to the access request. Furthermore the newly joined bus terminal may communicate with the bus controller or another bus terminal via the channel resource blocks allocated by the bus controller after having obtained the allocated channel resource blocks.

Referring to FIG. 2, a signal frame including an uplink random access system subframe is a special frame, and a signal frame including no uplink random access system subframe is a normal frame.

Subframes in the normal frame are arranged in the order of a downlink system subframe, a downlink subframe, a first guard interval, an uplink subframe, and a second guard interval.

Subframes in the special frame are arranged in the order of a downlink system subframe, a downlink subframe, a first guard interval, an uplink subframe, an uplink random access system subframe, and a second guard interval.

Here in the embodiment of the disclosure, the subframes of the signal frames are arranged according to the above-mentioned orders for the following advantageous effects: a downlink system subframe is arranged as the first subframe of each signal subframe so that the system can be synchronized rapidly using a downlink pilot signal carried in the downlink system subframe during system initialization, and since the downlink system subframe is arranged before a downlink subframe in each signal frame, the bus controller can also perform system synchronization and signal estimation via the downlink pilot signal carried in the downlink system subframe, after the system has started to operate stably and before the bus controller transmits data to the bus terminal each time, to improve the reliability of data transmission. Furthermore a first guard interval is arranged between the downlink subframe and an uplink subframe, and a second guard interval is arranged between the uplink subframe and a downlink system subframe of a next signal frame, to prevent collision while switching is happening between the uplink and downlink subframes so as to further improve the reliability of data transmission. Moreover the uplink random access system subframe of the special frame is arranged after the uplink subframe so that the bus terminal newly requesting for an access can transmit the access request to the bus controller in the uplink random access system subframe without hindering any bus terminal already accessing the bus controller from transmitting uplink data normally, to prevent collision with data transmission of any bus terminal already accessing the bus controller. Furthermore two access guard intervals can be further arranged respectively on two sides of the uplink random access system subframe to also prevent collision with data transmission of any bus terminal already accessing the bus controller.

Optionally a specified number of normal frames and a special frame can constitute a super-frame, where the special frame can be the last frame of the super-frame. The super-frame may consist of 256 frames. Of course, in a specific implementation, the configuration of the normal frames and the special frame, as well as the length of the super-frame can be adjusted according to a specific implementation scenario, but the embodiment of the disclosure is not be limited thereto.

Furthermore the number of OFDM symbols in each signal frame, $N_{SYM}$, and the length of an OFDM symbol, $T_{SYM}$, can be configured flexibly as needed by the system. The number of OFDM symbols included in the uplink subframe, the downlink system subframe, the downlink subframe, the guard intervals, and the uplink random access system subframe in the signal frame respectively can be configured and adjusted as needed in reality.

Figure 3:
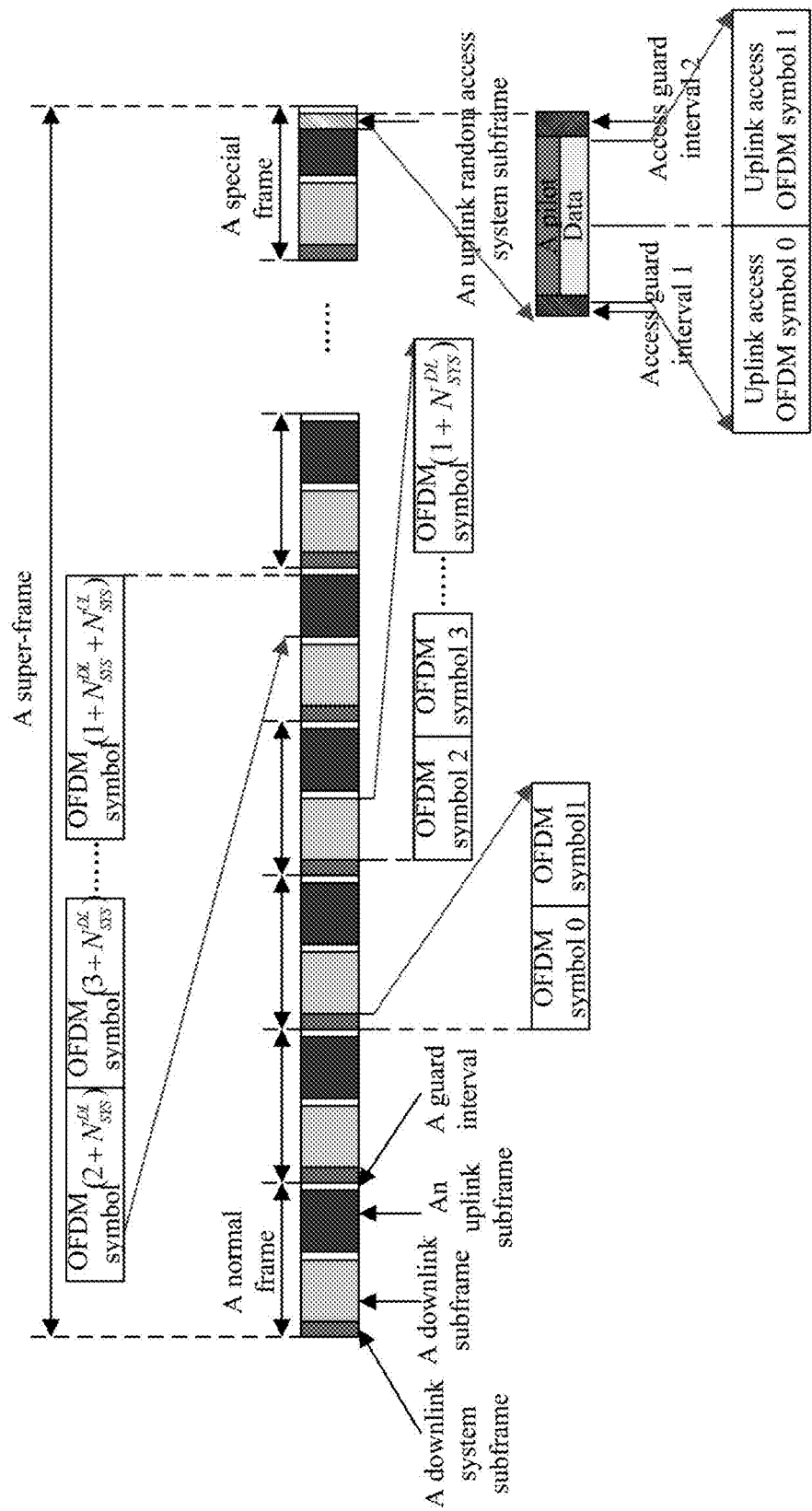
FIG. 3 is a schematic diagram of OFDM symbol configuration of each subframe in a frame structure according to an embodiment of the disclosure.

FIG. 3 illustrates a schematic diagram of OFDM symbol configuration of each subframe in a frame structure according to an embodiment of the disclosure.

For the normal frame, there may be two OFDM symbols in the downlink system subframe, $N_{SYS}^{DL}$ OFDM symbols in the downlink subframe, and $N_{STS}^{UL}$ OFDM symbols in the uplink subframe. Each OFDM symbol in the uplink subframe may carry a pilot signal and a data signal, and subcarriers of the uplink subframe occupied by the pilot signal and subcarriers of the uplink subframe occupied by the data signal can be allocated according to a preset ratio.

For the special frame, the numbers of OFDM symbols in the downlink system subframe, in the downlink subframe, and in the guard intervals are the same as those in the normal frame, but the last two OFDM symbols in the uplink subframe can be changed to OFDM symbols of the uplink random access system subframe, where these two OFDM symbols can be shared to transmit a pilot signal and a data signal in the uplink random access system subframe, and the ratio of allocated subcarriers of the uplink random access system subframe occupied by the pilot signal to subcarriers of the uplink random access system subframe occupied by the data signal can be preset as needed in reality, and optionally can be preset as 1:1. Furthermore there are also a first access guard interval and a second access guard interval on two sides of the uplink random access system subframe in the special frame, where the first access guard interval reserves time for switching between the uplink subframe and the uplink random access system subframe, and the second access guard interval reserves time for switching between the uplink random access system subframe and the downlink system subframe of the next signal frame to prevent collision while data is being transmitted.

Furthermore when the bus controller communicates with any bus terminal and the bus terminals communicates with each other using OFDM technology, data transmitted in a signal frame includes a destination IP address and a source IP address to locate corresponding bus terminals according to the Internet IP addresses. Furthermore in the embodiment of the disclosure, an IP function can be performed without being limited to IPV4 or IPV6, but can also be performed by extending the IP addresses.

Moreover according to the embodiment of the disclosure, a spare bus controller can also be configured in the system in an application scenario where high reliability is required, so the spare bus controller can be enabled upon determining that the bus controller in the system operates abnormally. Furthermore in an application scenario where high reliability is required, two identical but independent buses can also be configured, each user equipment can access both buses concurrently, and the two buses operate as a spare bus of each other, but only one of them operates at a time.

Figure 4:
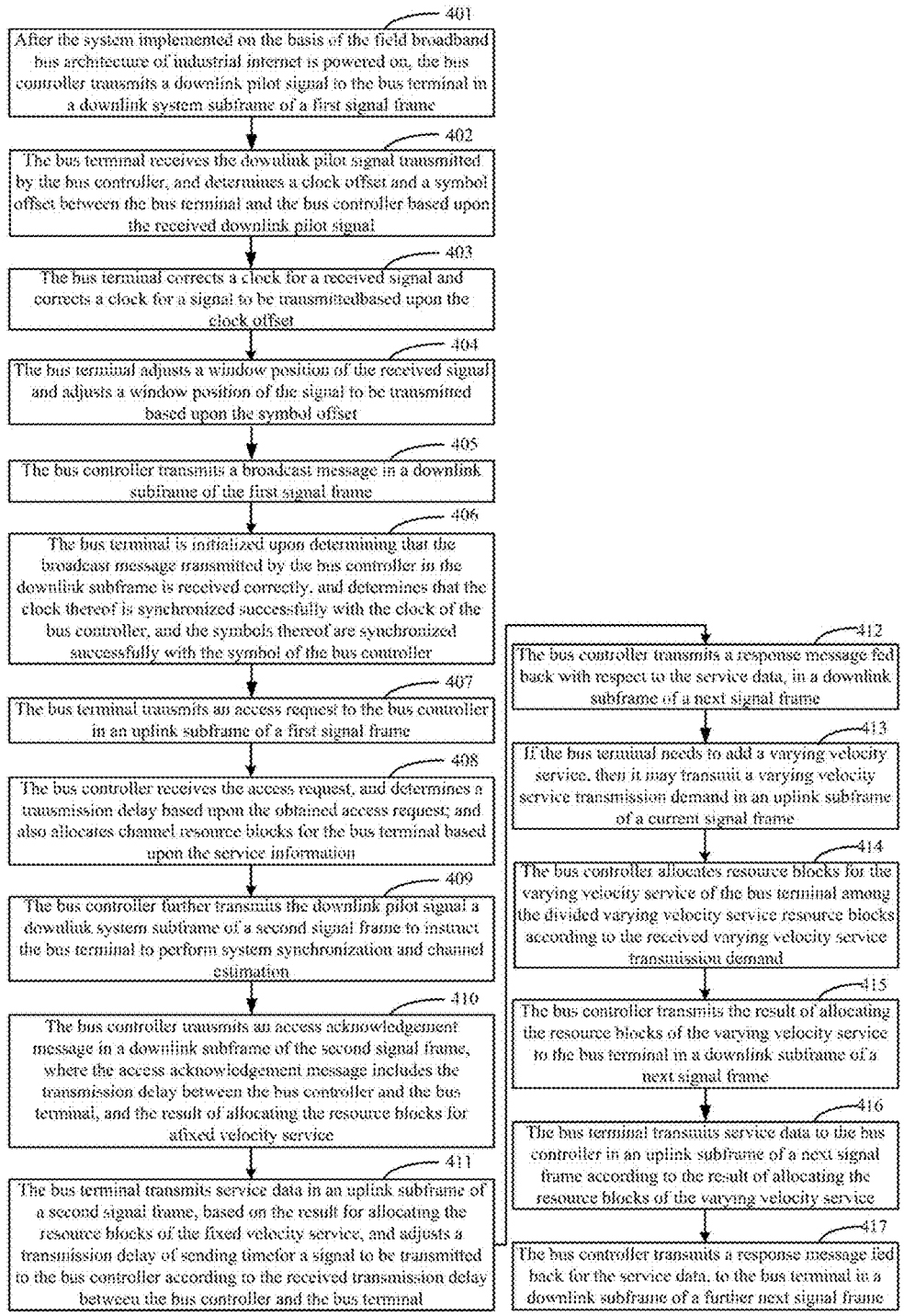
FIG. 4 is a schematic operating flow chart of a system implemented on the basis of a field broadband bus architecture of industrial internet according to an embodiment of the disclosure.

An operating flow of the system implemented on the basis of a field broadband bus architecture of industrial internet is described below in further details in the form of a specific implementation flow thereof with reference to the disclosure above and the schematic diagram of the frame structure according to the embodiment of the disclosure as illustrated in FIG. 2, specifically please refer to the flow diagram as illustrated in FIG. 4.

In the operation 401, after the system implemented on the basis of the field broadband bus architecture of industrial internet is powered on, the bus controller transmits a downlink pilot signal to the bus terminal in a downlink system subframe of a first signal frame.

In the operation 402, the bus terminal receives the downlink pilot signal transmitted by the bus controller, and determines a clock offset and a symbol offset between the bus terminal and the bus controller based upon the received downlink pilot signal.

In a specific implementation, the bus controller transmits two downlink pilot signals carried by two OFDM symbols in the downlink system subframe to each bus terminal.

Correspondingly the bus terminal calculates the clock offset and the symbol offset according to the two pilot signals in a current downlink system subframe, or can calculate the clock offset and the symbol offset according to one or both of pilot signals in the current downlink system subframe and one or both of pilot signals in the downlink system subframe of a last signal frame.

Here the clock offset can be calculated as follows.

The two downlink pilot signals are conjugate multiplied, subcarriers of the two downlink pilot signals are also conjugate multiplied, and the difference between the former product and the latter product is the clock offset.

In the operation 403, the bus terminal corrects a clock for a received signal and corrects a clock for a signal to be transmitted based upon the clock offset.

In this way, the clock of the bus terminal can be synchronized with the clock of the bus controller, and the clock of each of the bus terminal can be synchronized.

In the operation 404, the bus terminal adjusts a window position of the received signal and adjusts a window position of the signal to be transmitted, based upon the symbol offset.

In this way, symbols of the bus terminal can be synchronized with symbols of the bus controller, and the symbols of the bus terminal can be synchronized with symbols of other bus terminals.

In a specific implementation, a window position can be a window position of Fast Fourier Transformation (FFT). The bus terminal can calculate the symbol offset and determine a window position of FFT by using a symbol synchronization algorithm based upon pilot phase difference.

During system initialization, the symbol synchronization is typically coarse synchronization, where the symbol synchronization algorithm is used to determine a relative relationship between a start position of a currently received symbol and an ideal synchronization position, to determine whether an actual reception start position where the currently received symbol was started to be received is before or after the ideal synchronization position, to accordingly adjust the actual reception start position iteratively, to determine the adjusted synchronization position as a current synchronization position, to receive the next OFDM, and to repeat the operations above until the system is synchronized as required. After the system has started to operate stably, symbol synchronization is typically fine synchronization. After coarse symbol synchronization has finished, the symbol offset or position difference lies within an allowable range, and is further adjusted finely through fine synchronization to further diminish the symbol offset or the position difference.

In the embodiment of the disclosure, each bus terminal in the bus system firstly correct the clock for the received signal and correct the clock for the signal to be transmitted, according to the clock offset so that the clock of each bus terminal is synchronized with the clock of the bus controller. Then each bus terminal locates the window position of FFT according to the symbol offset so that the symbols of each bus terminal are synchronized with the symbol of the bus controller. In this way, the bus terminal which is clock and symbol-synchronized can subsequently receive the signal transmitted by the bus controller correctly.

In the operation 405, the bus controller transmits a broadcast message in a downlink subframe of the first signal frame, where the broadcast message includes a parameter required for the each bus terminal to initialize the system.

In the operation 406, the bus terminal is initialized upon determining that the broadcast message transmitted by the bus controller in the downlink subframe is received correctly, and determines that the clock thereof is synchronized successfully with the clock of the bus controller, and the symbols thereof are synchronized successfully with the symbol of the bus controller.

In the operation 407, the bus terminal transmits an access request to the bus controller in an uplink subframe of a first signal frame.

The access request carries service information including a service type and a service amount corresponding to the service type. Specifically, during initial accessing stage of a bus terminal, the service information may at least include a fixed velocity service of the bus terminal and a service amount corresponding to the fixed velocity service (i.e., a fixed velocity service transmission demand of the bus terminal).

In the operation 408, the bus controller receives the access request, and determines a transmission delay based upon the obtained access request; and also allocates channel resource blocks for the bus terminal based upon the service information.

Specifically after having received the access request message transmitted by the bus terminal, the bus controller determines sending time of the access request message based upon reception time of the obtained access request message and a sending time corresponding to a specified number of OFDM symbols in the uplink subframe. Then the bus terminal determines a transmission delay between the bus terminal and the bus controller based upon the difference between the reception time and the sending time of the access request message.

Specifically the bus controller can divide a preset number of subcarriers in the time domain into fixed velocity service resource blocks for transmitting the fixed velocity service and varying velocity service resource blocks for transmitting a varying velocity service, according to the fixed velocity service transmission demand of the bus terminal. The divided fixed velocity service resource blocks are a result of allocating resource blocks for the fixed velocity service of the bus terminal.

In the operation 409, the bus controller further transmits the downlink pilot signal in a downlink system subframe of a second signal frame to instruct the bus terminal to perform system synchronization and channel estimation.

Here the bus terminal can be synchronized with the bus controller as described in the operation 402 to the operation 404.

In the operation 410, the bus controller transmits an access acknowledgement message in a downlink subframe of the second signal frame, where the access acknowledgement message includes the transmission delay between the bus controller and the bus terminal, and the result of allocating the resource blocks for the fixed velocity service.

In the operation 411, the bus terminal transmits service data in an uplink subframe of a second signal frame, based on the result for allocating the resource blocks of the fixed velocity service, and adjust a transmission delay of sending time for a signal to be transmitted to the bus controller according to the received transmission delay between the bus controller and the bus terminal.

In the operation 412, the bus controller transmits a response message fed back for the service data, in a downlink subframe of a next signal frame.

So far the bus architecture has been initialized, and operates stably.

While the bus system is operating stably, the bus controller transmits the downlink pilot signal to the bus terminal in the downlink system subframe before it transmits data in the downlink subframe each time. Correspondingly the bus terminal performs system synchronization and channel estimation, after each reception of the downlink pilot signal in the downlink system subframe, although a repeated description thereof is omitted here.

In the operation 413, if the bus terminal needs to add a varying velocity service, then it may transmit a varying velocity service transmission demand in an uplink subframe of a current signal frame.

Here the varying velocity service transmission demand reported to the bus controller refers to that the service type reported to the bus controller is the varying velocity service and that the service amount corresponding to the varying velocity service is reported to the bus controller.

In the operation 414, the bus controller allocates resource blocks for the varying velocity service of the bus terminal among the divided varying velocity service resource blocks according to the received varying velocity service transmission demand.

In a specific implementation, if there are a plurality of varying velocity services in the varying velocity service transmission demand, then the priority of each varying velocity service is determined respectively according to the type of each varying velocity service, and a preset mapping relationship between a priority and a type of varying velocity service.

Here the preset mapping relationship between a priority and a type of varying velocity service can be as follows.

Firstly varying velocity services can be divided into three types of priority levels, including a real-time priority type (a first priority type), a waiting priority type (a second priority type), and a bandwidth priority type (a third priority type), according to their real-time characteristics, waiting time, and bandwidth demands. varying velocity services of each type of priority levels can be further subdivided.

Here a service with a high priority of the real-time priority type is a service for which real-time characteristics as well as limitation of time delays and jitters are strictly required, and a service with a low priority is a service for which real-time characteristics as well as limitation of time delays and jitters are less required.

A service with a high priority of the waiting priority type is a service for which there is a long waiting time for transmitting data to be transmitted, and a service with a low priority of the wait priority type is a service for which there is a short waiting time for transmitting data to be transmitted.

A service with a high priority of the bandwidth priority type is a service for which there is a high bandwidth demand for transmitting data to be transmitted, and a service with a low priority of the bandwidth priority type is a service for which there is a low bandwidth demand for transmitting data to be transmitted.

Then resource blocks among pre-divided varying velocity service resource blocks are allocated respectively for each varying velocity service according to the priority of each varying velocity service, and a result of allocating the resource blocks is transmitted to the bus terminal, so that the bus terminal transmits each varying velocity service correspondingly according to the result of allocating the resource blocks.

Stated otherwise, the priorities of the varying velocity services are determined so that varying velocity services with high priorities can be transmitted preferentially over resource blocks to further improve the real-time characteristic of data service transmission.

Furthermore a priority can also be determined for a fixed velocity service as described above, and in order to allocate fixed velocity service resource blocks for a fixed velocity service, if the bus terminal setting up a connection reports a plurality of fixed velocity services, then also a priority of each fixed velocity service may be determined respectively according to the type of each fixed velocity service, and a preset mapping relationship between a priority and a type of fixed velocity service. Resource blocks among corresponding pre-divided fixed velocity service resource blocks may be allocated respectively for each fixed velocity service according to the priority of each fixed velocity service, and a result of allocating resource blocks may be transmitted to the bus terminal, so that the bus terminal transmits each fixed velocity service correspondingly according to the result of allocating the resource blocks.

In the operation 415, the bus controller transmits the result of allocating the resource blocks of the varying velocity service to the bus terminal in a downlink subframe of a next signal frame.

In the operation 416, the bus terminal transmits service data to the bus controller in an uplink subframe of a next signal frame according to the result of allocating the resource blocks of the varying velocity service.

In the operation 417, the bus controller transmits a response message fed back for the service data, to the bus terminal in a downlink subframe of a further next signal frame.

The operating flow of the system operating stably has been described above. In a specific implementation, if a new bus terminal requests for an access to the bus controller while the system is operating stably, the new bus terminal may transmit an uplink pilot signal and an access request to the bus controller in an uplink random access system subframe of a special frame. Correspondingly the bus controller can perform channel estimation according to the uplink pilot signal, and allocate channel resource blocks for the bus terminal in response to the access request. Reference can be made to the flow above for a specific process thereof, so a repeated description thereof is omitted here.

In the system implemented on the basis of the field broadband bus architecture of industrial internet according to the embodiments of the disclosure, the bus controller can transmit data with each bus terminal using OFDM technology, and bus terminals can transmit data with each other using OFDM technology. The subcarriers occupied by each bus terminal does not interfere with each other, thus effectively preventing communication interference among the bus terminals, improving the utilization ratio of bandwidth during data transmission, and achieving a large bandwidth up to hundreds MHz. Furthermore the bus controller in the system can transmit a downlink pilot signal in a downlink system subframe so that each bus terminals is synchronized rapidly with the system based upon the downlink pilot signal. In the embodiments of the disclosure, each signal frame includes a downlink system subframe carrying a downlink pilot signal, so that each bus terminal can perform channel estimation according to the downlink pilot signal, thus improving the error correction capability of the system so as to improve the reliability of the system. Furthermore the bus controller can transmit a broadcast message in a downlink subframe to instruct each bus terminal to be initialized, so that each bus terminal is initialized. Furthermore each bus terminal can transmit an access request carrying service information in an uplink subframe, so that the bus controller can allocate channel resource blocks for each bus terminal according to the service information in the access request, and since the channel resource blocks are allocated in response to a service demand, the resources can be allocated more reasonably to provide real-time data transmission as demanded. Hereupon the embodiments of the disclosure provide a fast synchronized, real-time, high-speed, and reliable solution with respect to the good performance, high reliability, strict real-time characteristic and high security required by a field broadband bus architecture of industrial internet.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A system implemented on the basis of a field broadband bus architecture of industrial internet, the system comprising: a bus controller, bus terminals, and a two-wire bus, wherein the bus controller and the bus terminal are connected via the two-wire bus to constitute a network, the bus controller communicates with any of the bus terminal using Orthogonal Frequency Division Multiplexing, OFDM, technology, the bus terminals communicate with each other using OFDM technology, subcarriers occupied by each of the bus terminals do not interfere with each other, and a frame structure of a signal frame used during communication comprises a downlink system subframe, a downlink subframe, and an uplink subframe;

the bus controller is configured to: transmit a downlink pilot signal in the downlink system subframe; transmit a broadcast message in the downlink subframe to instruct a bus terminal to be initialized; after reception of an access request transmitted by the bus terminal in the uplink subframe, allocate channel resource blocks for the bus terminal based upon service information in the access request; and transmit a result of allocating the channel resource blocks to the bus terminal in the downlink subframe; and the bus terminal is configured to: perform system synchronization and channel estimation, based upon the received downlink pilot signal; transmit the access request in the uplink subframe after reception of the broadcast message; transmit and receive service data based upon the received result of allocating the channel resource blocks;

wherein each OFDM symbol in the uplink subframe carries an uplink pilot signal in addition to a data signal to instruct the bus controller to perform channel estimation; and a ratio of subcarriers of the uplink subframe occupied by the data signal to subcarriers of the uplink subframe occupied by the uplink pilot signal is allocated according to a preset ratio.

2. The system according to claim 1, wherein the downlink system subframe is a first subframe in each signal frame;

the bus controller is configured to transmit the downlink pilot signal to the bus terminal in the downlink system subframe before transmitting a downlink signal to the bus terminal in the downlink subframe; and the bus terminal is configured to: determine a clock offset and a symbol offset between the bus terminal and the bus controller based upon the received downlink pilot signal; correct a clock respectively for a received signal and a signal to be transmitted, based upon the clock offset; adjust a window position respectively for the received signal and the signal to transmitted, based upon the symbol offset; and adjust a transmission delay of sending time for a signal to be transmitted to the bus controller after a transmission delay between the bus terminal and the bus controller is determined, so as to be synchronized with the system.

3. The system according to claim 1, wherein the service information comprises a service type and a service amount corresponding to the service type; and the channel resource blocks allocated by the bus controller for the bus terminal comprise an uplink subframe channel resource block and a downlink subframe channel resource block;

the bus controller is configured to: allocate channel resource blocks corresponding to the service type for the bus terminal according to the service type; and determine the number of the allocated channel resource blocks corresponding to the service type based upon the service amount corresponding to the service type; and the bus terminal is configured to: transmit the service data to the bus controller over the uplink subframe channel resource block corresponding to the service type, according to the result of allocating the channel resource blocks; and receive a response message fed back by the bus controller for the received service data, over the downlink subframe channel resource block corresponding to the service type.

4. The system according to claim 1, wherein there are a first guard interval between a downlink subframe and a uplink subframe of the signal frame, and a second guard interval between a uplink subframe of the signal frame and a downlink system subframe of a next signal frame, wherein the first guard interval reserves time for switching between the downlink subframe and the uplink subframe of the signal frame, and the second guard interval reserves time for switching between the uplink subframe of the signal frame and the downlink system subframe of the next signal frame.

5. The system according to claim 4, wherein the signal frame further comprises an uplink random access system subframe;

the bus terminal is further configured to transmit the uplink pilot signal and the data signal to the bus controller in the uplink random access system subframe, wherein the data signal comprises the access request; and the bus controller is further configured to: perform channel estimation according to the uplink pilot signal, and allocate channel resource blocks for the bus terminal in response to the access request.

6. The system according to claim 5, wherein the bus controller transmits data in a first time slice consisting of the downlink subframe and the downlink system subframe; and the bus terminal transmits data in a second time slice consisting of the uplink subframe;

when the bus terminal communicates with the bus controller, then the bus terminal receives data in the downlink subframe and the downlink system subframe; and when the bus terminals communicate with each other, the bus terminals receive data in the uplink subframe.

7. The system according to claim 6, wherein a signal frame comprising the uplink random access system subframe is a special frame, and a signal frame comprising no uplink random access system subframe is a normal frame; subframes in the normal frame are arranged in the order of the downlink system subframe, the downlink subframe, the first guard interval, the uplink subframe, and the second guard interval; and subframes in the special frame are arranged in the order of downlink system subframe, the downlink subframe, the first guard interval, the uplink subframe, the uplink random access system subframe, and the second guard interval; and the number of OFDM symbols in each of the downlink system subframe, the downlink subframe, the first guard interval, the second guard interval, the uplink subframe, and the uplink random access system subframe is preset as needed.

8. The system according to claim 1, wherein when the bus controller communicates with any of the bus terminals using OFDM technology, and when the bus terminals communicate with each other using OFDM technology, data transmitted in the signal frame comprises a destination IP address and a source IP address.

9. The system according to claim 1, wherein the system further comprises a spare bus controller configured to be enabled when it is determined that the bus controller in the system operates abnormally.

* * * * *